(12) United States Patent
Iranpour Feridani et al.

(10) Patent No.: US 7,749,028 B2
(45) Date of Patent: *Jul. 6, 2010

(54) MICRO USB COMPATIBLE COMBO SYSTEM CONNECTOR

(75) Inventors: Ali R. Iranpour Feridani, Lund (SE); Nlls I. Henrik Borjeson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/433,072

(22) Filed: Apr. 30, 2009

(65) Prior Publication Data

US 2009/0215320 A1    Aug. 27, 2009

Related U.S. Application Data

(63) Continuation-in-part of application No. 11/875,065, filed on Oct. 19, 2007, now Pat. No. 7,537,489.

(51) Int. Cl.
*H01R 24/00* (2006.01)
(52) U.S. Cl. ..................................... 439/660
(58) Field of Classification Search ................. 439/660, 439/676, 680
See application file for complete search history.

(56) References Cited

U.S. PATENT DOCUMENTS 6,203,344 B1    3/2001  Ito
6,250,967 B1    6/2001  Chu
7,347,634 B2 *  3/2008  Gunther et al. ............... 385/92
7,393,247 B1 *  7/2008  Yu et al. ...................... 439/638
7,537,488 B2 *  5/2009  Iwakawa ...................... 439/660
2007/0077818 A1 * 4/2007  Iwakawa ...................... 439/610

FOREIGN PATENT DOCUMENTS

| EP | 1 146 369 | 10/2001 |
| EP | 1 511 128 | 3/2005 |
| EP | 1 617 518 | 1/2006 |
| FR | 2 828 586 | 8/2001 |

OTHER PUBLICATIONS

International Search Report and Written Opinion for International Application No. PCT/IB08/000936 dated Nov. 18, 2008.

* cited by examiner

*Primary Examiner*—Neil Abrams
*Assistant Examiner*—Phuong Nguyen
(74) *Attorney, Agent, or Firm*—Renner, Otto, Boisselle & Sklar, LLP

(57) ABSTRACT

A combination receptacle for electrically or optically communicating information via a cable medium includes a first receptacle having at least one first contact arranged in a first footprint of the first receptacle, said first receptacle configured to receive a first connector, and a second receptacle having at least one second contact arranged in a second footprint of the second receptacle, said second receptacle configured to receive a second connector. The first footprint and the second footprint at least partially overlap.

20 Claims, 4 Drawing Sheets

MICRO USB COMPATIBLE COMBO SYSTEM CONNECTOR

RELATED APPLICATION DATA

This application is a continuation-in-part of U.S. application Ser. No. 11/875,065 filed on Oct. 19, 2007, which is incorporated herein by reference in its entirety.

TECHNICAL FIELD OF THE INVENTION

The present invention relates generally to electronic devices, such as electronic devices for engaging in voice communications, rendering media content, etc. More particularly, the invention relates to a combination system connector/receptacle for use with electronic devices.

DESCRIPTION OF THE RELATED ART

Mobile and/or wireless electronic devices are becoming increasingly popular and are now in wide-spread use. In addition, the features associated with certain types of electronic devices have become increasingly diverse. To name a few examples, many electronic devices include cameras, text messaging capability, Internet browsing functionality, electronic mail capability, video playback capability, audio playback capability, image display capability, navigation capability, and hands-free headset interfaces.

A pervasive trend with electronic devices is the reduction in size and/or weight of such devices. For example, electronic devices employed in voice communications have reached dimensions that enable them to be comfortably placed in one's shirt or pants pocket, while at the same time packing the same or even more features than previous generation electronic devices.

In reducing the size of electronic devices, it is preferable to maintain at least two of the device's three dimensions at or above predetermined minimum dimensions. This enables the device to be easily handled and/or manipulated by a user. The device's third dimension, however, is free to be sized as desired, as it generally does not adversely affect use of the device. Typically, the dimension that is most often minimized is the device's thickness. This is evident from the fact that some electronic devices are approaching the thickness of a credit card.

As the thickness of electronic devices is reduced, interface cables used to provide data to/from such electronic devices becomes a limiting factor on how thin the device may be made (the device cannot be thinner than the interface receptacle itself). Thus, as devices become thinner, the interface cables, connectors, etc. that are used to communicate with such devices must be sized to accommodate the device's dimensions. This generally involves the implementation of new communication standards (e.g., from USB to mini USB to micro USB standards, etc.).

SUMMARY

A drawback to reducing the thickness of electronic devices is that the available space for receptacles, connectors and their corresponding cables is reduced. To accommodate this reduction in size, new receptacles, connectors, etc. are developed to enable further reductions in size (e.g., USB has transitioned from the standard USB connector to the mini USB connector, and now to the micro USB connector). Each different interface, however, still requires a corresponding receptacle on the electronic device. Thus, if the device is to be used with multiple communication standards (e.g., a micro USB interface and a proprietary interface), then the device requires a separate receptacle for each interface.

The present invention provides a combination receptacle for exchanging data with other devices, wherein the receptacle can accommodate multiple connector topologies. The combination receptacle includes a first receptacle having a first footprint, and a second receptacle having a second footprint, wherein the first and second footprint at least partially overlap, thereby conserving space. The first receptacle may be based on the micro USB standard, for example, while the second receptacle may be based on any other presently existing or subsequently developed standard. This can include, for example, proprietary interfaces, HDMI interfaces, analog to digital audio, accessory control bus, SLIMbus, Firewire, SATA, Ethernet, DPHY and MPHY MIPI interfaces, opto interfaces, Antenna interfaces, Card interfaces (e.g., µSD and M2), etc.

According to one aspect of the invention, a combination receptacle for electrically or optically communicating information via a cable medium includes: a first receptacle having at least one first contact arranged in a first footprint of the first receptacle, said first receptacle configured to receive a first connector; and a second receptacle having at least one second contact arranged in a second footprint of the second receptacle, said second receptacle configured to receive a second connector, wherein the first footprint and the second footprint at least partially overlap, and wherein the first receptacle is a high-definition multimedia interface (HDMI) receptacle and the second receptacle is a universal serial bus (USB) receptacle.

According to one aspect of the invention, a combination receptacle for electrically or optically communicating information via a cable medium includes: a first receptacle having at least one first contact arranged in a first footprint of the first receptacle, said first receptacle configured to receive a first connector; and a second receptacle having at least one second contact arranged in a second footprint of the second receptacle, said second receptacle configured to receive a second connector, wherein the first footprint and the second footprint at least partially overlap, and wherein the first receptacle is a SLIMbus receptacle and the second receptacle is a universal serial bus (USB) receptacle.

According to one aspect of the invention, a combination receptacle for electrically or optically communicating information via a cable medium includes: a first receptacle having at least one first contact arranged in a first footprint of the first receptacle, said first receptacle configured to receive a first connector; and a second receptacle having at least one second contact arranged in a second footprint of the second receptacle, said second receptacle configured to receive a second connector, wherein the first footprint and the second footprint at least partially overlap, and wherein the first receptacle is an antenna receptacle and the second receptacle is a USB receptacle.

According to one aspect of the invention, the entire second footprint is surrounded by the first footprint.

According to one aspect of the invention, the first receptacle includes a first casing defining the first footprint, and the second receptacle includes a second casing defining the second footprint.

According to one aspect of the invention, the first receptacle comprises a male receptacle and the second receptacle comprises a female receptacle.

According to one aspect of the invention, the first receptacle comprises a female receptacle having an interior wall defining the first footprint, and the at least one first contact is arranged along the interior wall.

According to one aspect of the invention, the second receptacle comprises a male interface, and the at least one second contact is arranged on the male interface.

According to one aspect of the invention, the first receptacle comprises a female interface, and the at least one first contact is arranged on an inner wall of the female interface.

According to one aspect of the invention, an electronic device is provided that includes a combination receptacle.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
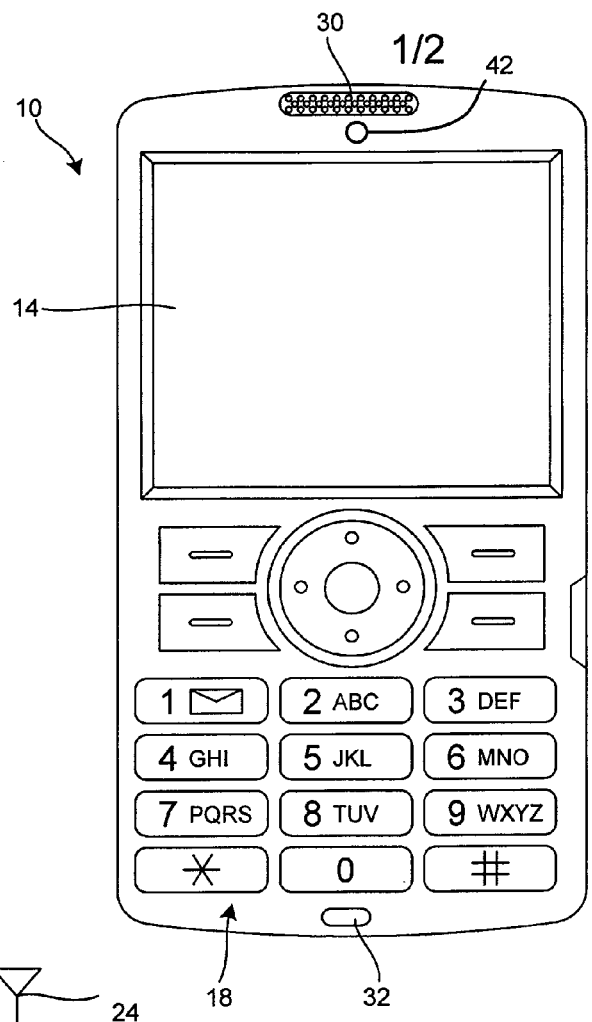
FIG. 1 is a schematic view of a mobile telephone as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus, portable gaming devices, portable media devices (video and/or audio), and the like.

In the present application, embodiments of the invention are described primarily in the context of a mobile telephone. However, it will be appreciated that the invention is not intended to be limited to the context of a mobile telephone and may relate to any type of appropriate electronic equipment.

Figure 2:
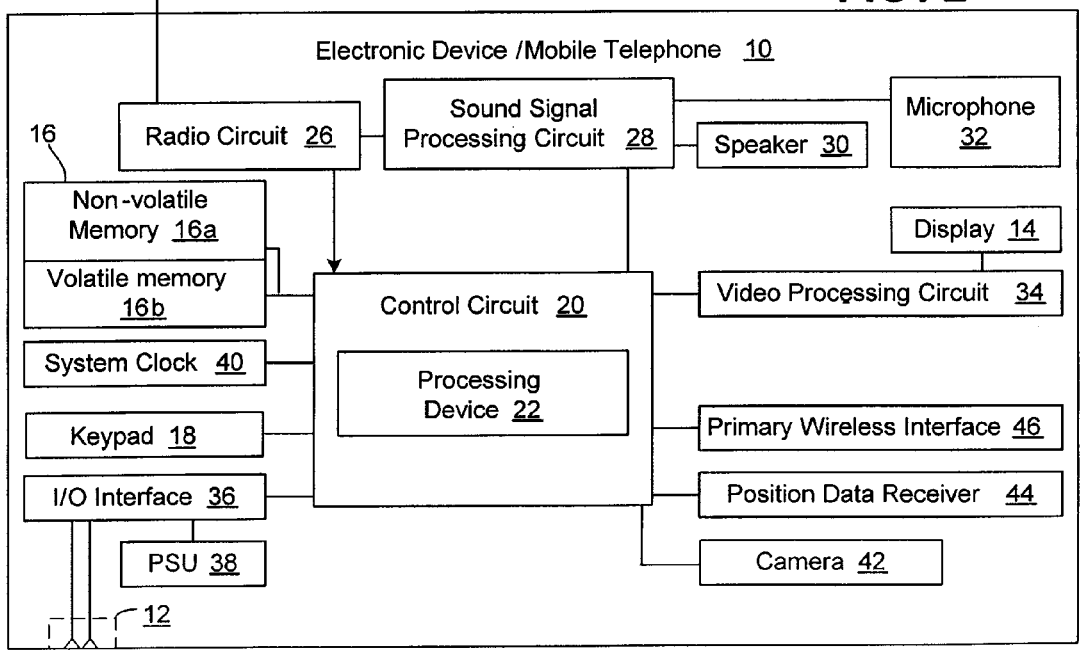
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic device 10 includes a combination receptacle 12 for communicating with other devices, including, for example, computers, other electronic devices, etc. Additional details with respect to the combination receptacle 12 will be described in greater detail below.

The electronic device of the illustrated embodiment is a mobile telephone and will be referred to as the mobile telephone 10. The mobile telephone 10 is shown as having a brick or block form factor, although other form factors, such as a "flip-open" form factor (e.g., a "clamshell" housing) or a slide-type form factor (e.g., a "slider" housing) also my be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc.

The mobile telephone 10 may be configured to transmit, receive and/or process data, such as text messages (e.g., a text message is commonly referred to by some as "an SMS," which stands for short message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein.

The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10.

The memory 16 may include a read only memory area that is implemented using nonvolatile memory 16a, and a random access or system memory area that is implemented using volatile memory 16b. As will be appreciated, nonvolatile memory tends not to lose data storage capability upon loss of power and is typically used to store data, application code, files and so forth. The nonvolatile memory 16a may be implemented with a flash memory, for example. As will be appreciated, volatile memory tends to lose data storage capability upon loss of power and is typically used to store data for access by the processing device 22 during the execution of logical routines. The volatile memory 16b may be a random access memory (RAM). Data may be exchanged between the nonvolatile memory 16a and the volatile memory 16b as is conventional. The nonvolatile memory 16a and the volatile memory 16b may be sized as is appropriate for the mobile telephone 10 or other electronic device in which the memory 16 is used.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data (e.g., via the combination receptacle 12). The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

Figure 3A:
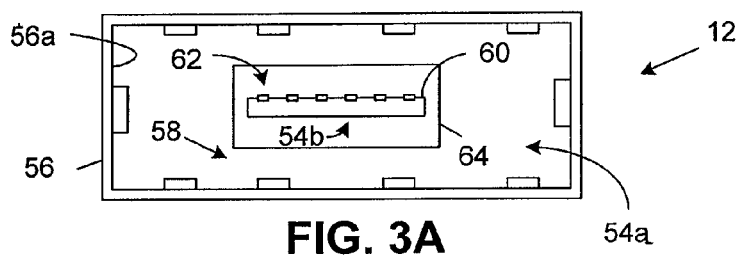
FIG. 3A is a schematic diagram of an exemplary communication receptacle in accordance with the invention.
Figure 3B:
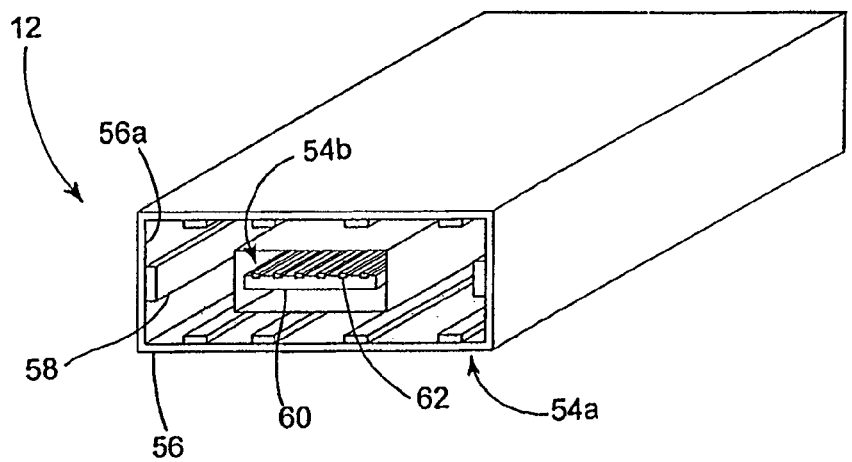
FIG. 3B is an isometric view of the receptacle of FIG. 3A.
Figure 4C:
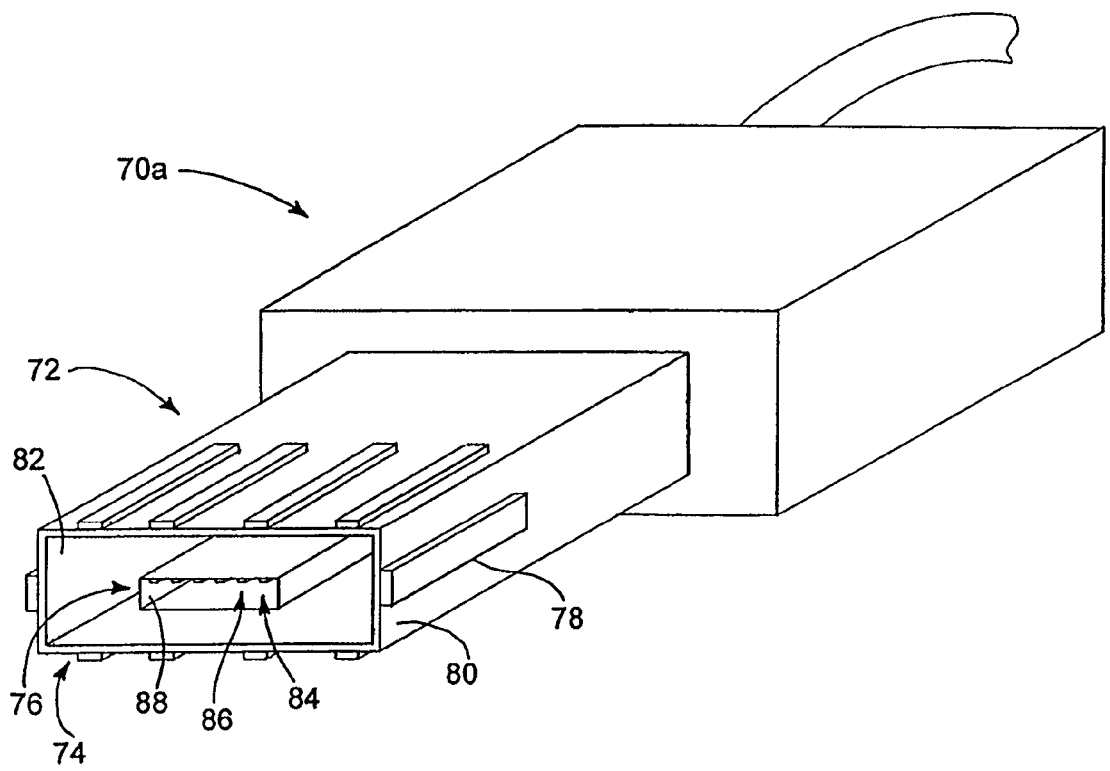

Moving now to FIGS. 3A and 3B, an exemplary combination receptacle 12 (e.g., a port) in accordance with the invention is shown. The combination receptacle 12 enables multiple and different communication topologies to be used in conjunction with the mobile telephone, while at the same time using a minimum amount of space.

The combination receptacle 12 includes a first receptacle 54a formed as a female receptacle, for example, and a second receptacle 54b formed as a male receptacle, wherein a footprint of the second receptacle 54b is at least partially within a footprint of the first receptacle 54a. As used herein, a footprint is the surface space occupied by a structure or device. Preferably, the footprint of the first receptacle completely encircles or surrounds the footprint of the second receptacle (e.g., the second receptacle is formed inside the first receptacle). While the exemplary first and second receptacles are shown as a female and male receptacle, respectively, it is noted that the configuration of the respective receptacles may be reversed (e.g., the first receptacle may be a male receptacle and the second receptacle may be a female receptacle), or they both may be the same type of receptacle (e.g., two male or two female receptacles).

Preferably, the second receptacle is a USB receptacle that utilizes a standard USB, mini USB or micro USB interface (i.e., the receptacle footprint and pin out correspond to the standard footprint and pin out for USB, mini USB or micro USB interfaces), and the first receptacle can be a HDMI (high-definition multi-media interface). HDMI is a compact audio/video interface for transmitting uncompressed digital data. As is known by those having ordinary skill in the art, HDMI connects digital audio/video sources to compatible digital audio devices, computer monitors, and digital televisions. The number of pins utilized in an HDMI connector depends on the version of the connector. Type C or mini connectors, which are used for portable devices, have a 19 pin configuration.

Alternatively, the second receptacle can be a USB (standard, mini or micro) interface and the first receptacle can be a SLIMbus (serial low-power inter-chip media bus) interface. SLIMbus is a standard interface between baseband or application processors and peripheral components, and provides a reduced pin out relative to other interface standards. SLIMbus consists of two terminals, the data line (DATA) and the clock line (CLK), which can be interconnected to multiple SLIMbus devices. SLIMbus uses a multidrop bus topology where all bus signals are common to all components on the bus. SLIMbus also uses a time division multiplexed (TDM) architecture that allows multiple receiver and transmitter devices to reside on the bus and allows all devices to inter-communicate within allocated channels and time frames.

In yet another embodiment, the second receptacle can be a USB (standard, mini or micro) interface and the first receptacle can be an antenna interface. The antenna interface can be configured for use with short range radio signals transmitted and/or received by the electronic device, such as GSM, CDMA, WCDMA, GPRS, WiFi, WiMax, DVB-H, ISDB-T, etc.

Other possible interfaces for the first receptacle include an analog to digital audio interface, an accessory control bus interface, a Firewire interface, a SATA interface, an Ethernet interface, a DPHY and MPHY MIPI interface, an opto interface, a Card interface (e.g., μSD and M2), etc.

Since the combination connector in accordance with the present invention includes at least two different types of interfaces, the footprint for each receptacle (e.g., the receptacle for USB and the receptacle for HDMI) of the connector need not conform to the corresponding standard, so long as the receptacle accommodates the all the electrical connections for the standard. Preferably, the footprint and pin out for at least one of the receptacles corresponds to at least one of the standards. For example, if the second receptacle is a micro USB receptacle, then the footprint and pin out of the second receptacle is configured such that any standard micro USB connector can be inserted into the receptacle.

The first receptacle 54a of the combination receptacle 12 comprises a casing 56 that defines the footprint of the first receptacle 54a. The casing may be formed as a metal or plastic casing as is conventional. The casing 56, which is shown having the general shape of a rectangle, includes an inner wall 56a. The casing 56 and/or inner wall 56a, however, may comprise any shape (e.g., oval, circular, square, etc.). Arranged along the inner wall 56a are one or more contacts 58 or the like (e.g., electrical contacts, optical couplers, etc.). The one or more contacts 58 can communicate signals, such as electrical signals or optical signals, for example, to/from the receptacle. The actual number of contacts 58 can be based on the intended application of the first receptacle 54a. For example, an optical connection may comprise a single optical coupler, while an HDMI connection may comprise nineteen electrical contacts.

The second receptacle 54b of the combination receptacle 12 comprises a fitting or plug 60 for interfacing with a corresponding portion of a connector (e.g., a connector having a female connector as described below). As above, although the plug 60 is shown having the general shape of a rectangle, the plug 60 may comprise any shape as required by the application, and may comprise multiple parts (e.g., two or more plugs 60).

The plug 60 defines a footprint of the second receptacle 54b, wherein the footprint of the second receptacle 54b is at least partially within the footprint of the first receptacle 54a (preferably surrounded by the first footprint). One or more contacts 62 (e.g., electrical contacts, optical couplers, etc.) are arranged along the plug 60, which acts as a support structure or mounting base for said contacts 62. Again, the number of contacts 62 can be based on the intended application of the second receptacle 54b (e.g., USB, fire wire, etc.).

The second receptacle 54b may include a casing or support structure 64 formed around the plug 60 (e.g., a shell that surrounds the plug 60). The casing 64 may be formed as a metal or plastic casing, for example. If the casing 64 is present, then the casing 64 further defines the footprint of the second receptacle. In either case, and as noted above, the footprint of the second receptacle is at least partially within the footprint of the first receptacle. The casing 64 enables a standard cable (i.e., a cable configured to work with only the second receptacle 54b) to be used with the combination receptacle 12. For example, if the second receptacle 54b is embodied as a micro USB connector, then a standard micro USB cable may be used to interface with only the second receptacle 54b. Thus, one need not use a cable specifically designed for the combination receptacle 12 in order to use at least part of the combination receptacle's functionality.

Figures 4A, 4B:
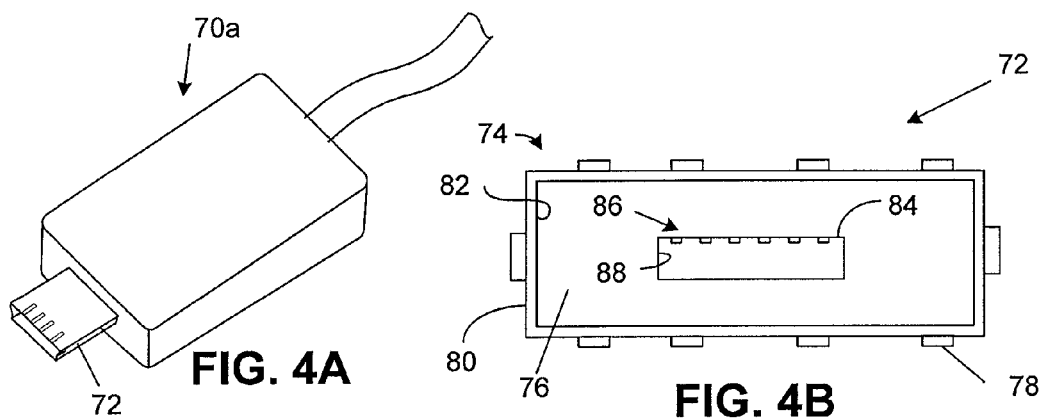
FIGS. 4A-6C are schematic and isometric drawings of exemplary cables and connector portions of the cables in accordance with the invention, wherein the cables can be used with the receptacle of FIG. 3A.

Moving now to FIGS. 4A-6C, three different cables are shown that may be used with the combination receptacle 12. FIGS. 4A-4C illustrate a first cable 70a having a combination connector 72 that can be used to interface with the combination receptacle 12. More specifically, the combination connector 72 includes a first connector 74 (for interfacing with the first receptacle 54a), and a second connector 76 (for interfacing with the second receptacle 54).

The first connector 74 includes an elongated portion that forms a male plug, and one or more contacts 78 arranged along an outer surface 80 of the elongated portion. Further, the contacts 78 correspond with contacts 58 of the first receptacle 54a. Thus, as the combination connector 72 is mated with the combination receptacle 12, the contacts 78 of the first connector 74 couple with the contacts 58 of the first receptacle 54a so as to enable signals to be passed between the receptacle and connector.

The second connector 76 is coupled to inner walls 82 of the first connector 74 and comprises a slot or opening 84 for interfacing with the second receptacle 54b of the combination receptacle 12. One or more contacts 86 are formed along an inner wall 88 of the slot 84, wherein the contacts 86 correspond with the contacts 62 of the second receptacle 54b. Thus, as the combination connector 72 is mated with the combination receptacle 12, the contacts 86 of the second connector 76 couple with the contacts 62 of the second receptacle 54.

Figures 5A, 5B:
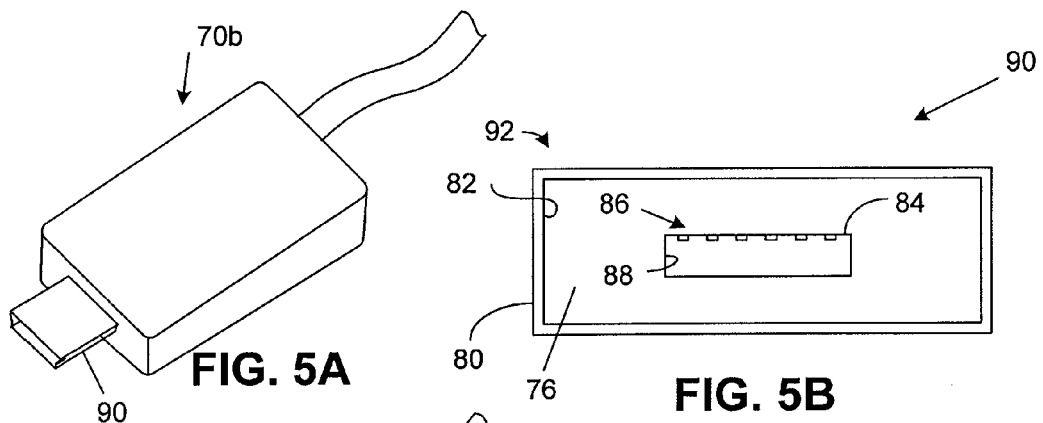
Figure 5C:
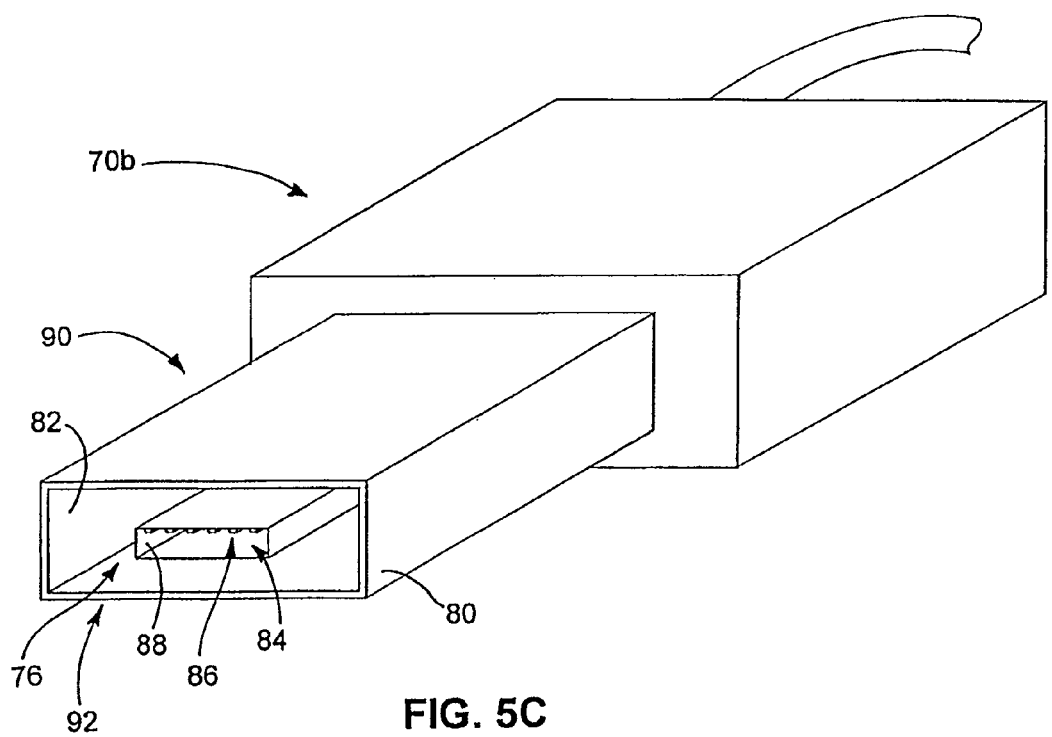

FIGS. 5A, 5B and 5C show another exemplary cable 70*b* having a single connector 90 that is configured to be used with combination receptacle 12. Like the connector 72, the connector 90 includes a first connector 92 for interfacing with the first receptacle 54*a*, and a second connector 76 for interfacing with the second receptacle 54*b*. The second connector 76 of the cable 70*b* is identical to the second connector 76 of the cable 70*a*. However, the first connector 92 of the cable 70*b* is different from the first connector 74 of the cable 70*a*. More specifically, the first connector 92 does not include contacts and, thus, a signal connection cannot be established with the first receptacle 54*a*. The cable 70*b* may be a used as a cost effective means for coupling devices to the combination receptacle 12 when only a single connection (e.g., a connection as defined by the second receptacle 54*b*) is needed.

Figures 6A, 6B:
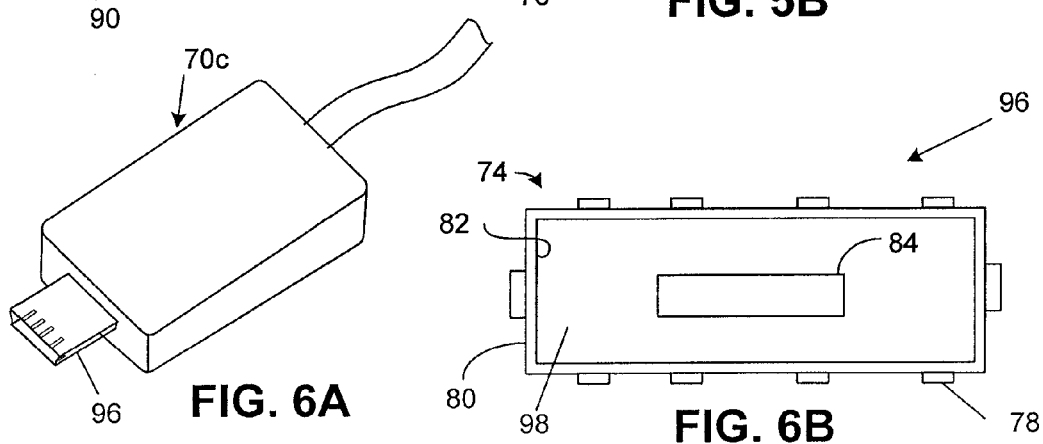
Figure 6C:
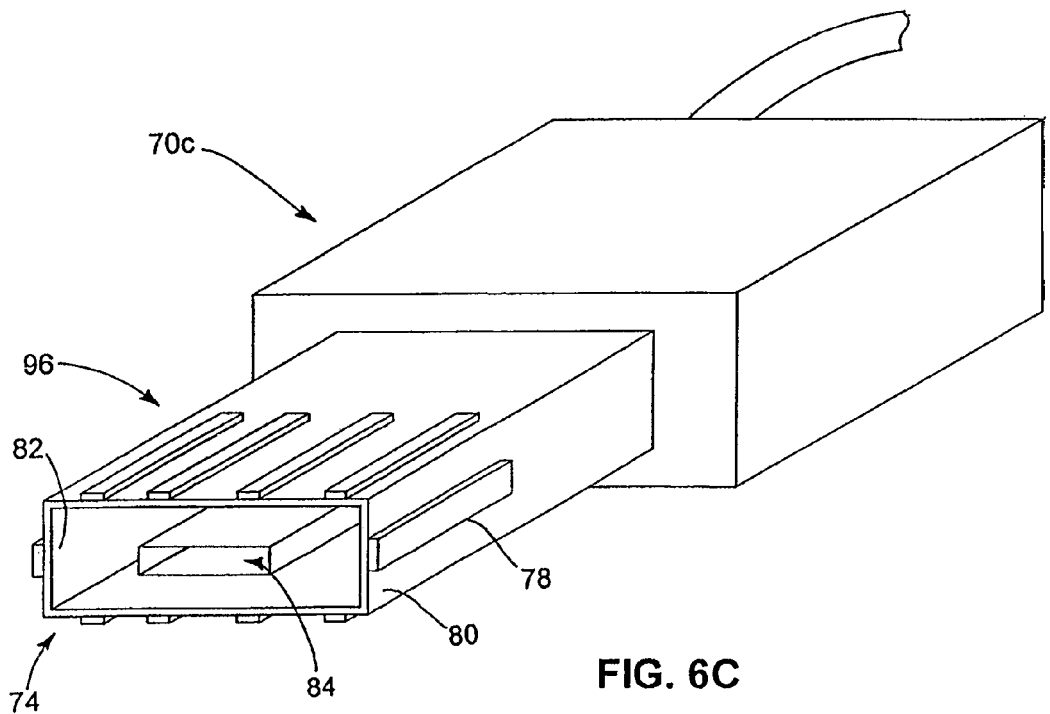

FIGS. 6A, 6B and 6C illustrate another cable 70*c* that is similar to the cable 70*b* of FIGS. 5A, 5B and 5C. A connector 96 of the cable 70*c* includes a first connector 74 that is identical to the first connector 74 of the cable 70*a*. The second connector 98, however, does not include contacts. The cable 70*c* may be a used as a cost effective means for coupling devices to the combination receptacle 12 when only a single connection (e.g., a connection as defined by the first receptacle 54*a*) is needed.

Accordingly, a combination receptacle and corresponding cable have been disclosed that enable efficient use of available space on ever shrinking electronic devices. The respective receptacles and connectors may be configured for any presently existing or subsequently developed interface, non-limiting examples of which include USB, mini USB, micro USB, firewire, HDMI, or proprietary interfaces. For example, the first and second receptacles may comprise two standard interfaces (e.g., micro USB and standard USB), or a standard interface combined with a proprietary interface (e.g., a micro USB interface and a proprietary interface).

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A combination receptacle for electrically or optically communicating information via a cable medium, comprising:
    a first receptacle having at least one first contact arranged in a first footprint of the first receptacle, said first receptacle configured to receive a first connector; and
    a second receptacle having at least one second contact arranged in a second footprint of the second receptacle, said second receptacle configured to receive a second connector,
    wherein the first footprint and the second footprint at least partially overlap, and
    wherein the first receptacle is a high-definition multimedia interface (HDMI) receptacle and the second receptacle is a universal serial bus (USB) receptacle.

2. The combination receptacle according to claim 1, wherein the first receptacle comprises a male receptacle and the second receptacle comprises a female receptacle.

3. The combination receptacle according to claim 1, wherein the first receptacle comprises a female receptacle having an interior wall defining the first footprint, and the at least one first contact is arranged along the interior wall.

4. An electronic device comprising the combination receptacle according to claim 1.

5. The combination receptacle according to claim 1, wherein the entire second footprint is surrounded by the first footprint.

6. The combination receptacle according to claim 5, wherein the first receptacle includes a first casing defining the first footprint, and the second receptacle includes a second casing defining the second footprint.

7. The combination receptacle according to claim 1, wherein the second receptacle comprises a male interface, and the at least one second contact is arranged on the male interface.

8. The combination receptacle according to claim 7, wherein the first receptacle comprises a female interface, and the at least one first contact is arranged on an inner wall of the female interface.

9. A combination receptacle for electrically or optically communicating information via a cable medium, comprising:
    a first receptacle having at least one first contact arranged in a first footprint of the first receptacle, said first receptacle configured to receive a first connector; and
    a second receptacle having at least one second contact arranged in a second footprint of the second receptacle, said second receptacle configured to receive a second connector,
    wherein the first footprint and the second footprint at least partially overlap, and
    wherein the first receptacle is a SLIMbus receptacle and the second receptacle is a universal serial bus (USB) receptacle.

10. The combination receptacle according to claim 9, wherein the first receptacle comprises a female receptacle having an interior wall defining the first footprint, and the at least one first contact is arranged along the interior wall.

11. The combination receptacle according to claim 9, wherein the second receptacle comprises a male interface, and the at least one second contact is arranged on the male interface.

12. An electronic device comprising the combination receptacle according to claim 9.

13. The combination receptacle according to claim 9, wherein the entire second footprint is surrounded by the first footprint.

14. The combination receptacle according to claim 13, wherein the first receptacle includes a first casing defining the first footprint, and the second receptacle includes a second casing defining the second footprint.

15. A combination receptacle for electrically or optically communicating information via a cable medium, comprising:
- a first receptacle having at least one first contact arranged in a first footprint of the first receptacle, said first receptacle configured to receive a first connector; and
- a second receptacle having at least one second contact arranged in a second footprint of the second receptacle, said second receptacle configured to receive a second connector,
- wherein the first footprint and the second footprint at least partially overlap, and
- wherein the first receptacle is an antenna receptacle and the second receptacle is a USB receptacle.

16. The combination receptacle according to claim 15, wherein the first receptacle comprises a female receptacle having an interior wall defining the first footprint, and the at least one first contact is arranged along the interior wall.

17. The combination receptacle according to claim 15, wherein the second receptacle comprises a male interface, and the at least one second contact is arranged on the male interface.

18. An electronic device comprising the combination receptacle according to claim 15.

19. The combination receptacle according to claim 15, wherein the entire second footprint is surrounded by the first footprint.

20. The combination receptacle according to claim 19, wherein the first receptacle includes a first casing defining the first footprint, and the second receptacle includes a second casing defining the second footprint.

* * * * *